Aug. 13, 1935.　　　H. H. ROBINSON　　　2,011,082
ORIFICE METER FITTING
Filed May 18, 1931　　　2 Sheets-Sheet 1
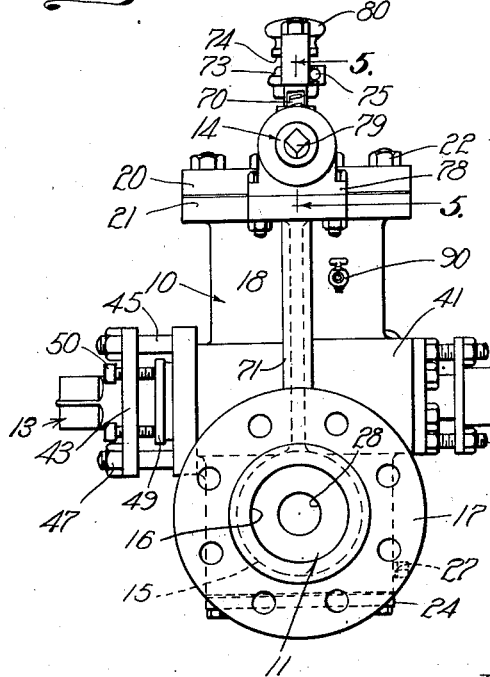
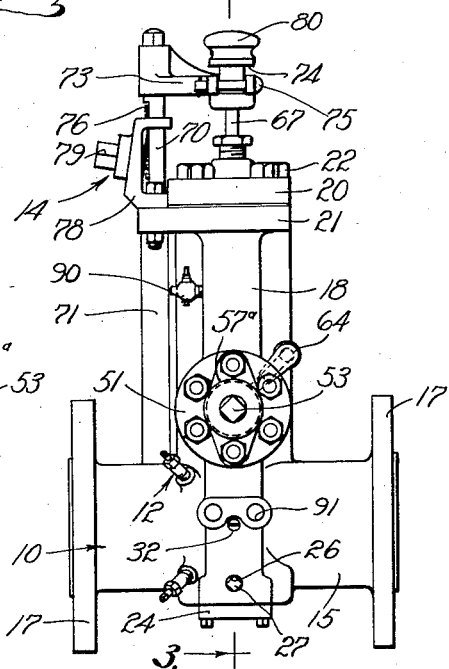
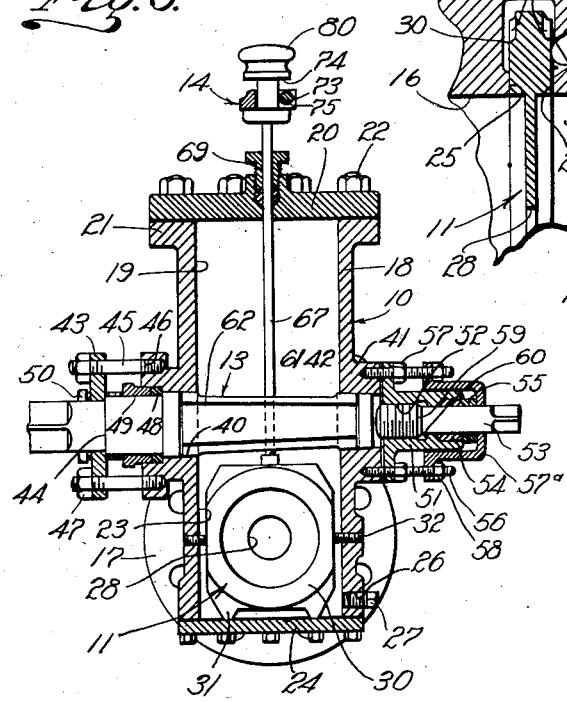
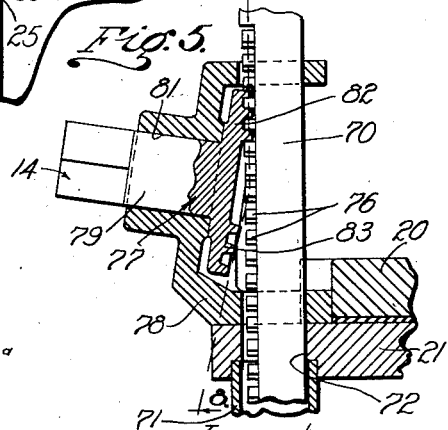
Inventor
Henry H. Robinson
By Wm K Maxwell
His Attorney

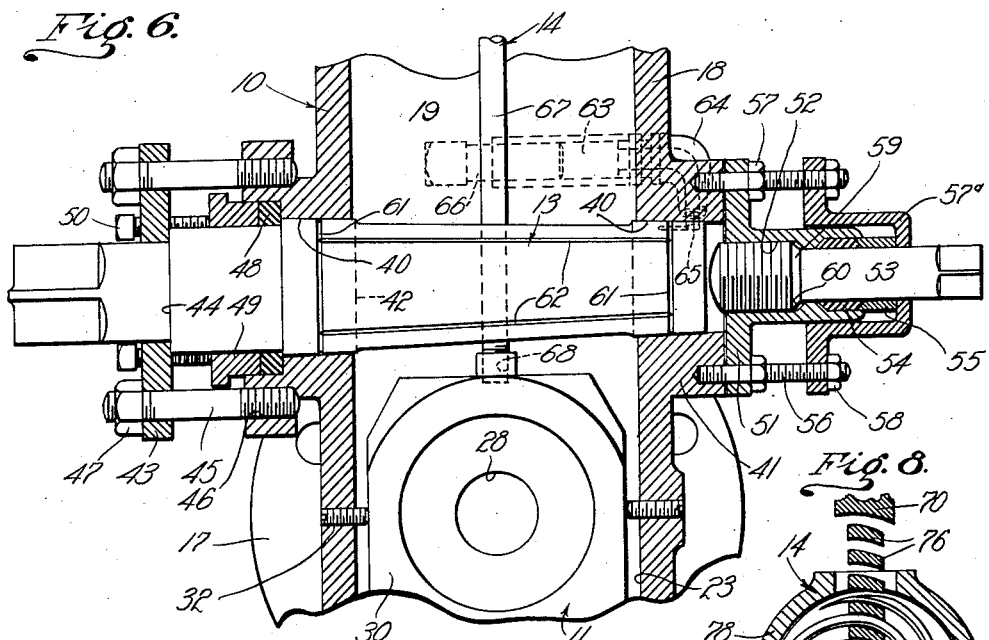
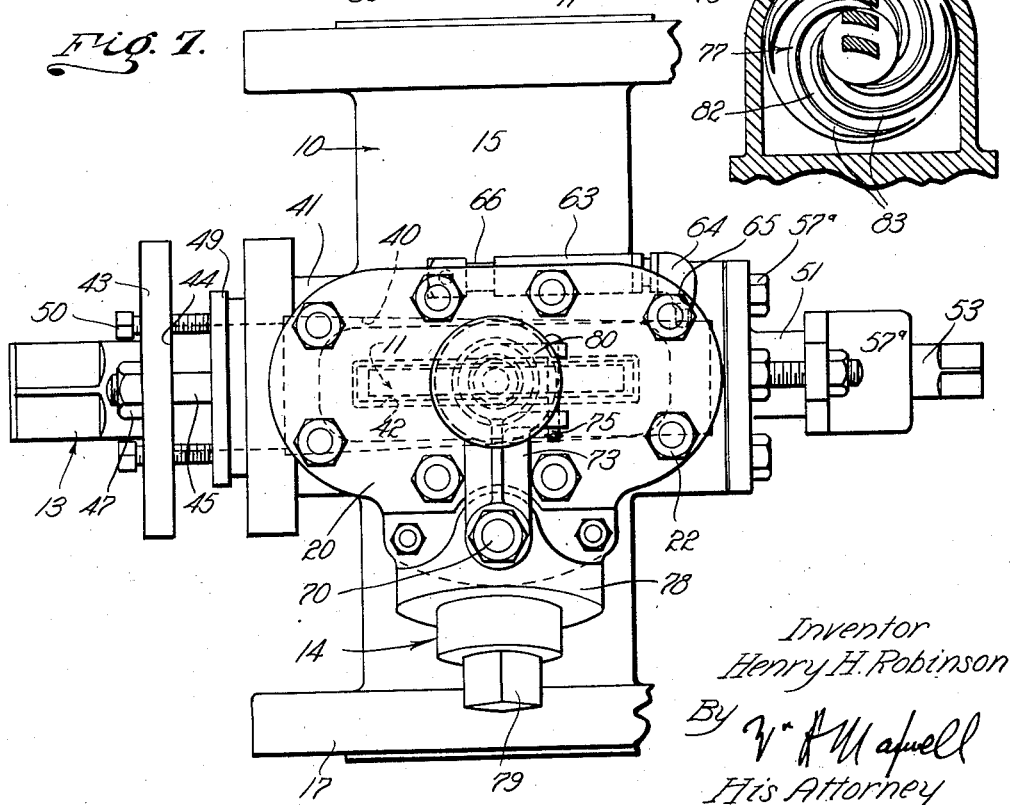

Patented Aug. 13, 1935

2,011,082

UNITED STATES PATENT OFFICE 2,011,082

ORIFICE METER FITTING

Henry H. Robinson, Los Angeles, Calif., assignor to Robinson Orifice Fitting Company, Los Angeles, Calif., a corporation of Nevada Application May 18, 1931, Serial No. 538,120

8 Claims. (Cl. 137—75)

This invention relates to a device for use in metering the flow of fluid through a pipe line or conduit, and relates more particularly to an orifice meter fitting for carrying an orifice disc or plate.

Devices commonly known as orifice meter fittings or orifice fittings are interposed in pipe lines to carry and handle orifice plates for arrangement across the conduits or pipe lines. It is necessary to quite frequently change the orifice plates to compensate for wear, changes in the conditions of flow through the conduits, etc. It is accordingly desirable to provide means for easily and quickly replacing the orifice plates and to provide fluid-tight seals about the working parts.

It is a general object of the invention to provide a simple, practical, and improved orifice meter fitting of the general character described and claimed in Patent Number 1,569,305, granted to Anson Robinson January 20, 1926.

It is another object of the invention to provide an orifice meter fitting that is particularly adapted for use in pipe lines or conduits handling fluid at high pressures.

It is another object of the invention to provide an orifice meter fitting in which the orifice disc or plate may be easily and quickly replaced without cutting off or stopping the flow of fluid through the pipe line and without an appreciable loss or leakage of fluid.

It is another object of the invention to provide an orifice meter fitting, provided with packing glands about the movable parts, that may be easily and quickly repacked without removing the pressure from the fitting and without the danger of leakage when being replaced when the fitting is under pressure.

It is another object of the invention to provide a novel and improved means for releasably holding the orifice plate in position across the fluid passage of the fitting.

A further object of the invention is to provide a practical and effective means for operating or shifting the orifice plate through the fitting between the position in the fluid passage and the position where it may be released.

A further object of the invention is to provide an orifice meter fitting of the character mentioned in which the parts of the operating mechanism for shifting the orifice plate are housed or encased so that they may be effectively lubricated and so that they are protected against rusting or corrosion.

Other objects and features of my invention will be best and more fully understood from the following detailed description of a typical form and application of the invention, throughout which description reference will be had to the accompanying drawings, in which:

Fig. 1 is an end elevation of the fitting provided by the present invention. Fig. 2 is a side elevation of the fitting. Fig. 3 is a vertical detailed sectional view taken as indicated by line 3—3 on Fig. 2, showing the orifice plate in position across the fluid passage. Fig. 4 is an enlarged fragmentary sectional view of a portion of the fitting, illustrating one of the units for releasably clamping the orifice plate in position. Fig. 5 is an enlarged vertical detailed sectional view of a portion of the mechanism for shifting the orifice plate. Fig. 6 is an enlarged vertical detailed sectional view of the central portion of the fitting. Fig. 7 is an enlarged top or plan view of the fitting, and Fig. 8 is a detailed sectional view taken substantially as indicated by line 8—8 on Fig. 5.

The fitting provided by my present invention includes, generally, a body 10 adapted to be arranged or mounted in a pipe line, an orifice plate 11 operable between a position across the fluid passage of the body 10 and a position where it may be replaced, means 12 for releasably holding the orifice plate in position across the fluid passage, a plug 13 for sealing between the fluid passage of the body and the replacement chamber of the body, and means 14 for operating or shifting the orifice plate 11.

The main or lower end portion 15 of the body 10 is cylindrical in its general configuration, and is provided with a longitudinal fluid passage 16 adapted to register with the opening or passage of the pipe line. Suitable flanges 17 may be provided at the opposite ends of the body around the opening 16 to connect with flanges or flanged fittings on the pipe line. In accordance with the standard practice, the opening 16 is of round cross section. A laterally or upwardly projecting neck 18 is provided on the body 10 intermediate its ends. The neck 18 is integral with the main portion 15 of the body, and is provided with a chamber 19 for receiving the orifice plate 11 when it is to be replaced. The neck 18 and its chamber 19 are rectangular in cross sectional configuration, and the upper end of the chamber is closed by a cover plate 20. A flange 21 is provided on the upper end of the neck 18, and bolts or screws 22 detachably connect the cover plate 20 with the flange. The lower end of the chamber 19 joins or communicates with the fluid passage 16, and may be cut off from the fluid passage or closed by the plug 13, as will be hereinafter described. A pet cock or relief valve 90 is provided to discharge or release fluid pressure from the chamber 19, as will be hereinafter described.

A recess 23 is provided in the wall of the opening or fluid passage 16 to receive the edge portions of the orifice plate 11. The recess 23 is in direct vertical alignment and register with the chamber 19 and is shaped to effectively receive the orifice plate 11. The lower end of the recess 23 may be closed by a removable plate 24. Annular sealing faces 25 are provided on the opposite walls of the recess 23 around the fluid passage 16. The sealing faces 25 are parallel and are ground or finished to co-operate with sealing faces on the orifice plate 11, as will be hereinafter described. Drain openings 26 are provided through the walls of the body to communicate with the recess 23 and may be normally closed by plugs 27.

The orifice plate 11 is a comparatively thin rectangular member and is provided with a central opening or orifice 28 for passing fluid when the plate is in position across the fluid passage 16. The plate 11 is proportioned to pass into the upper chamber 19 and fits the recess 23 with suitable edge clearance. Annular enlargements or ridges 29 are provided on the opposite sides of the plate 11 and are concentrically curved about the central axis of the opening 28. The annular ridges 29 are provided with sealing faces 30 to co-operate with the sealing faces 25 of the body. The sealing faces 30 are ground or finished to have a sliding sealing fit with the faces 25. Spaced lugs or feet 31 are provided on the lower end of the orifice plate 11 to engage the plate 24 to center the plate 11 vertically in the recess. Socket-headed or slotted screws 32 are threaded through openings in the body wall to project into the recess 23 and center the plate 11 horizontally. When the orifice plate 11 is in the position illustrated throughout the drawings, its opening 28 is centrally positioned in, or coaxial with, the fluid passage 16.

The means 12 for holding or retaining the orifice plate 11 in operating position in the recess 23 is in the nature of a screw means for clamping the plate 11 in sealing engagement with one of the faces 25. The means 12 includes a plurality of like units, each including a nipple or plug 33 screw-threaded into an opening 34 in the body and a screw 35 threaded through the plug 33 to engage the orifice plate 11. There may be any suitable number of these plate-holding units provided at spaced points on the body 10 at the low pressure side of the recess 23. In the particular instance illustrated in the drawings, there are four spaced holding units for clamping the orifice plate in position in the recess. The openings 34 are inclined longitudinally and inwardly at suitable angles. In practice, the openings 34 may be at 45° relative to the longitudinal axis of the fluid passage 16 and 45° relative to the vertical axis of the fitting. The inner ends of the openings 34 communicate with the recess 23 at one of the sealing faces 25.

The plugs 33 are screw-threaded into enlarged outer end parts of the opening 34. The plugs 33 are tubular and the set screws 35 are screw-threaded into or through the plugs. The set screws 35 extend through the openings 34 to engage the orifice plate 11. The extreme inner ends of the screws 35 may be rounded to effectively engage one of the faces 30. The screws 35 project outwardly beyond the outer ends of the plugs 33 and are provided with flattened or polygonal end parts for engagement by a wrench, or the like. It will be apparent how the set screws 35 may be employed to clamp against the orifice plate 11 to hold it against movement and in sealing engagement with the annular sealing face 25 at the high pressure end of the fitting.

Packing means are provided for sealing about the set screws or holding screws 35. Packing 36 is provided in the outer ends of the plugs 33 to seal about the screws 35. Glands or followers 37 are provided to compress the packing, and nuts 38 are screw-threaded on the outer ends of the plugs 33 to force the followers 37 into compressive engagement with the packing.

It is an important feature of the present invention that the packing 36 may be removed or replaced when the fitting is under pressure without the leakage of fluid around the screws 35. Annular flanges $38^a$ are provided on each screw 35 to slidably fit the inner portions of the openings 34. The opposite sides of the flanges $38^a$ are in the nature of beveled sealing faces, and the inner ends of the plugs 33 are beveled to be in the form of sealing faces. Annular sealing faces 39 are provided in the inner end portions of the openings 34. When it is desired to replace the packing 36 of one of the units, the screws 35 may be backed out or threaded out so that the annular sealing shoulder $38^a$ comes into engagement with the inner end of the plug 33. The gland 37 may then be removed and the packing 36 replaced without the danger of leakage around the screws 35. If it is desired to repack about the screws 35 when the orifice plate 11 is in the up or out position for replacement, the screws 35 may, if desired, be threaded inwardly so that the sealing shoulder $38^a$ comes into engagement with the seat 39 to provide a fluid-tight seal around the screw.

The plug 13 is provided to close off or seal off the chamber 19 from the fluid passage 16. The plug 13 is arranged in a transverse horizontal opening 40 at the inner end of the chamber 19. The end portions of the opening 40 extend through body parts 41 projecting from opposite sides of the body 10. The plug-carrying opening 40 intersects the lower portion of the chamber 19 to have opposite wall portions formed in the opposite side walls of the chamber. The plug 13 is longitudinally tapered and the opening 40 is correspondingly shaped to tightly receive the plug. The plug 13 is comparatively long to have its smallest end within one of the body parts 41 and to have its largest end projecting outwardly from the other body part 41. An elongated transverse slot 42 is provided in the plug 14 for passing the orifice plate 11. The plug 14 is operable between a position where the slot 42 is closed by the walls of the opening 40 and a position where the slot is in vertical alignment with the orifice plate 11 to pass the plate. The extreme end of the projecting part of the plug is made polygonal to facilitate the operation of turning of the plug.

Means is provided for forcing or urging the plug 14 into the opening 40 to provide for an effective seal between the plug and the walls of the opening. A collar 43 is slidably arranged on the outer end of the plug and is adapted to engage against an outwardly facing shoulder 44 on the plug. Studs 45 extend through openings in the collar 43 and are threaded into openings 46 in the body part 41. Nuts 47 are screw-threaded onto the outer ends of the studs 45 to clamp against the collar 43 and maintain the plug 13 in effective pressural engagement with the walls of the opening 14.

The invention includes means for packing or sealing about the large end of the plug 13. Suitable packing 48 is arranged in an enlarged outer end part of the opening 40. A follower or gland 49 is provided to compress the packing. Set screws or compression screws 50 are threaded through openings in the collar 43 and are adapted to force and retain the gland 49 in the position where the packing 48 tightly seals about the plug.

Means is provided whereby the plug 13 may be loosened to facilitate its operation or turning in the event that it becomes stuck or jammed in the opening 40. The means for loosening or breaking loose the plug 13 includes a cap 51 mounted on the body part 41 at the small end of the opening 40. The cap 51 is provided with an opening 52 and a jack screw 53 is screw-threaded into the opening 52. The jack screw 53 may be threaded inwardly to engage against the end of the plug 13 to force the plug outwardly through the opening 40. The screw 53 projects outwardly from the cap 51 and is provided with a flattened or polygonal end part for engagement by a wrench, or the like. When it is desired to employ the jack screw 53 to break loose the plug 13, the nuts 47 are preferably loosened or threaded outwardly prior to threading of the jack screw against the small end of the plug.

The cap 51 and jack screw 53 completely close off the smaller end of the opening 40, and the invention provides packing means for sealing about the screw 53 in the opening 52 of the cap. Packing 54 is provided in the opening 52 to seal about an unthreaded portion of the screw. A gland 55 is provided to compress the packing 54. Screw-threaded studs 56 project outwardly from the body part 41 and nuts 57 are threaded on the studs to retain the cap 51 in position. A compression member 57a encases the outer end portion of the head 51 and is in engagement with the outer end of the gland 55. Certain of the studs 56 extend outwardly through openings in the member 57a and nuts 58 are provided on the studs to urge the member 57a inwardly so as to compress the packing 54.

In accordance with the preferred form of the invention, means is provided whereby the packing 54 may be replaced when the fitting is under pressure without danger of leakage around the screw 53. A beveled or tapered sealing face 59 is provided on the screw 53 at the outer end of its thread. A beveled sealing face 60 is provided in the opening 52 at the outer end of the thread in the opening. When it is desired to replace the packing 54 when the fitting is passing fluid under pressure, the jack screw 53 may be threaded or backed outwardly so that its sealing face 59 comes into engagement with the face 60 to provide a fluid-tight seal around the screw. The member 57a and the gland 55 may then be removed to permit the replacement of the packing 54 without danger of leakage from the small end of the opening 40. In practice, the jack screw 53 may normally be in the position where its face 59 seals with the face 60 to provide a sealing means in addition to the packing 54.

In accordance with the preferred embodiment of the invention, means is provided for lubricating the plug 13 and for providing a hydraulic seal for the plug. Annular lubricant or grease grooves 61 are provided around the plug within the end portions of the opening 40. The annular grooves 61 are joined or connected by spaced longitudinal grooves 62. A lubricant-carrying cylinder 63 is connected with the opening 40 by a suitable fitting or elbow 64 threaded into an opening 65 in the body. The opening 65 communicates with the opening 40 at a point in alignment with an annular grease groove 61. A plug or plunger 66 is screw-threaded into the outer end of the cylinder 63 and may be employed to force lubricant into the opening 40 and the lubricant grooves of the plug. It will be apparent how lubricant may be supplied to the grooves 60 and 61 under high pressures so as to effectively lubricate the plug and to provide a liquid seal about the opposite ends of the plug.

The means 14 for shifting or operating the orifice plate 11 between the position in the recess 23 and the position in the chamber 19 includes an elongated vertical rod 67 extending into the chamber 19. The lower end of the rod 67 is adapted to be screw-threaded into an opening 68 in the upper end or edge of the orifice plate. The rod 67 extends upwardly or outwardly through an opening and packing gland 69 in the cover plate 20. A suitable operating knob 80 may be provided on the upper end of the rod 67. When the orifice disc 11 is in the operating position in the recess 23, the rod 67 may be left in connection with the plate 11, in which case it extends upwardly through the slot 42 of the plug 13. If it is desired to close off the chamber 19 from the fluid passage when the orifice disc is in its normal position, the rod 67 may be threaded out of the opening 68 and raised to a position where it is above the plug 13 so that the plug may be turned to the closed position.

Where the fitting is employed to handle or pass fluid under high pressure, considerable force is required to move or operate the rod 67 to shift the orifice plate. The present invention provides an improved mechanism for operating the rod 67 to shift the orifice plate through the body 10. The operating mechanism includes a vertically disposed elevator shaft or rack shaft 70. The elevator shaft 70 is slidably carried in a tubular housing 71. The lower end of the housing 71 may be supported on the main portion 15 of the body, while the upper end of the housing may extend into an opening 72 in the flange 21. The elevator shaft 70 extends outwardly through the opening 72 to project above the cover plate 20. A releasable operative connection is provided between the upper end of the elevator shaft 70 and the operating rod 67. A laterally projecting arm 73 is provided on the upper end of the shaft 70. The arm 73 is rotatable on the shaft 70, and its outer end is split or bifurcated. The knob 80 of the rod 67 is provided with vertically opposed shoulders 74. The split ends of the arm 73 are adapted to extend between the shoulders 74, and a removable pin 75 may extend between the split portions of the arm to retain the arm in co-operative engagement with the knob 80.

The elevator shaft 70 is provided with a flattened side and a plurality of vertically or longitudinally opposed teeth 76 are provided on the flattened side of the shaft. The teeth 76 are longitudinally curved or arcuate, as illustrated in Fig. 8 of the drawings. A rotatable disc or pinion 77 is provided to operate the shaft 70. The pinion 77 may be carried by a suitable bracket 78 mounted on the flange 21. The pinion 77 includes an outwardly projecting stem 79 rotatable in an opening 81 in the bracket. A circular or disc-shaped head 82 is provided on the inner end of the stem 79. Gear parts 83 are provided on the inner side of the head to mesh or cooperate with the teeth 76. The gear parts 83 project from the inner face of the head 82 and are spirally curved. The gear parts 83 are curved outwardly and circumferentially from a circle concentric to the axis of rotation of the pinion to the periphery of the head 82. The curved parts 83 are shaped and spaced to effectively co-operate with the spaced rack teeth 76. The pinion 77 is carried by the bracket 78 to rotate about an axis inclined relative to the horizontal so that its gear parts 83 co-operate with the rack teeth 76 at only one side of the center of rotation of the pinion. The stem 79 projects outwardly from the bracket 78 and is provided with a polygonal outer end adapted to be engaged by a suitable operating crank or tool. Upon the pinion 77 being rotated, the elevator shaft 70 is operated longitudinally or vertically. As the shaft 70 moves longitudinally without turning or rotating, there is no torque or turning force transmitted to the rod 67. It is to be noted that the stem 79 projects substantially horizontally outward so that it is particularly easy to engage and operate.

Openings 91 are provided in the walls of the body 10 to communicate with the fluid passage 16 at opposite sides of the recess 23. The openings 91 are provided to receive the ends of pipes or conduits connected with a suitable pressure-indicating or recording instrument.

It is believed that the utility and practicability of the orifice meter fitting provided by the present invention will be readily apparent from the foregoing detailed description. During normal operation, the orifice plate 11 is disposed in the recess 23, where it extends across the fluid passage 16. The opening 28 of the orifice plate is comparatively small relative to the fluid passage 16 so that a difference of pressure is obtained at the opposite sides of the plate. The orifice plate is effectively retained in position by the several set screws 35 which hold it in sealing engagement with the sealing face 25 at the high pressure side of the plate. The rod 67 may remain connected with the orifice plate 11. However, it may be desirable to disconnect the rod from the plate so that the plug 13 may be closed to cut off the chamber 19 from the fluid passage 16. The arm 73 may be normally disconnected from the rod knob 74 so that the rack shaft 70 may be maintained in a down position where its major portion is within the housing 71 where it is protected against the elements. When it is desired to inspect or replace the orifice disc 11, the plug 13 is turned or operated to the open position where its slot 42 is in alignment with the plate 11. The rod 67 may then be threaded into the opening 68 and the arm 73 connected with the knob 80 of the rod. The set screws 35 may then be backed away from the plate 11 so that the plate is free to be operated upwardly. The plate may then be shifted upwardly into the chamber 19 by rotating the pinion 77. Rotation of the pinion 77 causes longitudinal movement of the shaft 70 and corresponding movement of the rod and plate 11. When the plate 11 has been shifted into the chamber 19, the plug 13 may be turned to the closed position to cut off the chamber from the fluid passage 16. The release valve or stop cock 90 may then be opened to relieve the pressure from the chamber 19. After the pressure has been removed from the chamber 19, the arm 73 may be disconnected from the rod and swung to an out position and the cover plate 20 removed so that the orifice plate may be withdrawn from the fitting. It will be apparent how the orifice plate 11 or a new orifice plate may again be positioned across the fluid passage 16, and how the plate 12 may be replaced to close the upper end of the chamber 19.

The set screws 35 are operable to tightly clamp or hold the orifice plate against the sealing face 25 at the high pressure end of the opening 16 and to retain the orifice plate in its proper position. The guide screws 32 and the fitting 31 operate to properly center the orifice plate 11 in the recess 23. After the orifice plate has been arranged in the desired position, the rod 37 may be left in connection with the plate or may be removed from the orifice plate so that the lower end of the chamber 19 may be closed. To release the rod 65 from the orifice plate, the pin 75 is withdrawn from the arm 73 and the arm swung to a position so that the rod 67 may be shifted upwardly. After the rod 67 has been raised or drawn upwardly, the plug 13 may be operated to the closed position to close off the chamber 19 from the fluid passage. Under normal conditions, the shaft 70 may be operated downwardly within the tubular housing 71 so that it is protected against the elements.

It is to be noted that the present invention provides the improved means 12 for holding the orifice plate in tight sealing engagement with the fitting 25 and provides an improved packing means in connection with the means 12 that may be readily repacked when the fitting is under pressure. The packing 36 may be easily and quickly replaced without any danger of leakage after the screw 35 has been backed outward to seal with the inner end of the plug 33. The opposite ends of the closing plug 13 are effectively sealed about by packing means that may be easily repacked when under pressure. The lubricating means for the plug lubricates the plug so that it is not apt to freeze or jam in the opening 40 and also provides a liquid seal around the end parts of the plug to prevent leakage. The operating means 14 is such that the orifice plate 11 may be easily and quickly operated or shifted through the body when there is high pressure in the body. The operating means 14 is simple in construction and is such that it may be operated from the side or end of the fitting. Further, the means 14 is such that the rod 67 is not subjected to any torque, turning, or bending strains when it is operated. The rack shaft 70 moves longitudinally and parallel with the rod 67 without rotation. As the shaft 70 and pinion 77 are mounted at the exterior of the fitting, they are easily accessible at all times and are not subjected to the action of the fluid being handled. The jack screw 53 is adapted to serve two purposes, that is it is adapted to break loose the plug 13 from the opening 40 and is operable to provide an auxiliary seal at the small end of the plug during the replacement of the packing 54.

Having described only a typical preferred form of my invention, I do not wish to limit myself to the specific details set forth, but wish to reserve to myself any changes and variations that may appear to those skilled in the art or fall within the scope of the following claims:

Having described my invention, I claim:

1. In an orifice meter fitting, a body having a passage and a longitudinally tapered opening intersecting the passage, a longitudinally tapered plug in the said opening in the body and operable to close off the passage, a cap closing the small end of the opening, a jack screw carried by the cap for engaging the plug, and means for packing about the jack screw.

2. In an orifice meter fitting, a body having a passage and a longitudinally tapered opening intersecting the passage, a longitudinally tapered plug in the said opening in the body and operable to close off the passage, a cap closing the small end of the opening, a jack screw threaded through the cap and operable to clamp against the plug, packing for sealing about the screw, and means for sealing between the screw and cap when the packing is to be replaced.

3. In an orifice meter fitting, a body having a passage and a longitudinally tapered opening intersecting the passage, a longitudinally tapered plug in the said opening in the body and operable to close off the passage, a cap closing the small end of the opening, a jack screw threaded through the cap and operable to clamp against the plug, packing for sealing about the screw, and means for sealing between the screw and cap when the packing is to be replaced, said means including a sealing face on the cap, and a part on the screw adapted to seal with said face.

4. In an orifice meter fitting, a body having a passage and a longitudinally tapered opening intersecting the passage, a longitudinally tapered plug in the said opening in the body and operable to close off the passage, a cap closing the small end of the opening, a jack screw extending through an opening in the cap and operable to engage the end of the plug, a packing gland at the opening for packing about the screw, and auxiliary sealing means for sealing about the screw when the gland is to be replaced.

5. In an orifice meter fitting, a body having a passage and a longitudinally tapered opening intersecting the passage, a longitudinally tapered plug in the said opening in the body and operable to close off the passage, and means for urging the plug into the opening including a collar for engaging a part at the large end of the plug, and screw means for operating the collar.

6. In an orifice meter fitting, a body having a passage and a longitudinally tapered opening intersecting the passage, a longitudinally tapered plug in the said opening in the body and operable to close off the passage, a collar for engaging a part at the large end of the plug, screw means for actuating the collar, a packing gland for packing about the large end of the plug, and means carried by the collar for compressing the gland.

7. An orifice meter fitting including, a body having a fluid passage, and a chamber in communication with the passage, an orifice plate, and means external to the body and readily accessible for operating the plate between a position across the fluid passage and a position in the chamber including a rod connected with the plate and projecting from the body, a longitudinally shiftable rack shaft substantially parallel with the rod, a pinion for operating the shaft, and an operative connection between the shaft and the rod.

8. An orifice meter fitting including, a body having a fluid passage, and a chamber in communication with the passage, an orifice plate, and means external to the body and readily accessible for operating the plate between a position across the fluid passage and a position in the chamber including a rod connected with the plate and projecting from the body, a longitudinally shiftable rack shaft substantially parallel with the rod, a tubular housing for the shaft, a pinion for operating the shaft, and a releasable operative connection between the shaft and rod.

HENRY H. ROBINSON.